(12) United States Patent
Shovlin

(10) Patent No.: US 6,421,881 B1
(45) Date of Patent: Jul. 23, 2002

(54) SNAP-ON GEAR SHIFT KNOB

(75) Inventor: William D. Shovlin, Harrison Township, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/604,362

(22) Filed: Jun. 27, 2000

(51) Int. Cl.⁷ .................................................. E05B 1/00
(52) U.S. Cl. ..................... 16/441; 16/DIG. 41; 74/548; 74/553
(58) Field of Search ........................... 16/441, DIG. 41; 74/543, 548, 523, 473.1, 551.8, 551.9, 553; 116/279, 284; 403/329

(56) References Cited

U.S. PATENT DOCUMENTS

| | | | |
|---|---|---|---|
| 2,182,007 A | * 12/1939 | Tegarty | 16/441 |
| 3,699,613 A | * 10/1972 | Skinner | 16/441 |
| 3,757,383 A | * 9/1973 | Iiyoshi | 16/441 |
| 3,907,448 A | * 9/1975 | Kolibar et al. | 16/441 |
| 3,961,855 A | * 6/1976 | Basile | 403/329 |
| 4,113,399 A | 9/1978 | Hansen, Sr. | |
| 4,179,771 A | 12/1979 | Rankins et al. | |
| 4,295,246 A | 10/1981 | Howie, Jr. | |
| 4,441,230 A | 4/1984 | Howie, Jr. | |
| 4,791,826 A | 12/1988 | Behrens | |
| 4,896,556 A | * 1/1990 | Takada | 74/523 |
| 4,923,325 A | 5/1990 | Howie, Jr. | |
| 5,148,718 A | 9/1992 | Kakuguchi et al. | |
| 5,197,161 A | 3/1993 | Howie, Jr. | |
| 5,285,034 A | 2/1994 | Skogard et al. | |
| 5,305,660 A | * 4/1994 | Hasegawa | 74/553 |
| 5,388,307 A | 2/1995 | Hyde | |
| 5,537,893 A | 7/1996 | Snider | |
| 5,588,329 A | 12/1996 | Nedachi | |
| 5,765,449 A | * 6/1998 | LeMire | 16/441 |
| 5,783,285 A | 7/1998 | Howie, Jr. | |
| 5,806,378 A | 9/1998 | Friedman | |
| 5,857,242 A | 1/1999 | Pizzo et al. | |
| 5,893,298 A | 4/1999 | Keister | |
| 5,928,763 A | 7/1999 | Howie, Jr. | |
| 6,058,797 A | * 5/2000 | Konig et al. | 16/436 |

FOREIGN PATENT DOCUMENTS

| | | | | |
|---|---|---|---|---|
| CA | 537579 | * | 2/1957 | 16/441 |
| DE | 0269088 | * | 6/1989 | 16/441 |
| EP | 0772112 | | 5/1997 | |
| EP | 1004800 | | 5/2000 | |

OTHER PUBLICATIONS

International Search Report dated Oct. 9, 2001.

* cited by examiner

*Primary Examiner*—Chuck Y. Mah
(74) *Attorney, Agent, or Firm*—Carlson, Gaskey & Olds

(57) ABSTRACT

A gear shift assembly including a knob with a body has a shaft that is adapted for receiving the gearshift knob. A fastener is mounted within the body of the gearshift knob for removably securing the gearshift knob to the shaft. The fastener further includes a resilient inner flange for interacting with the gear shift shaft to removably secure said gear shift knob to said gear shift shaft to prevent the gear shift knob from sliding off of the shaft or from rotating about the shaft.

15 Claims, 5 Drawing Sheets

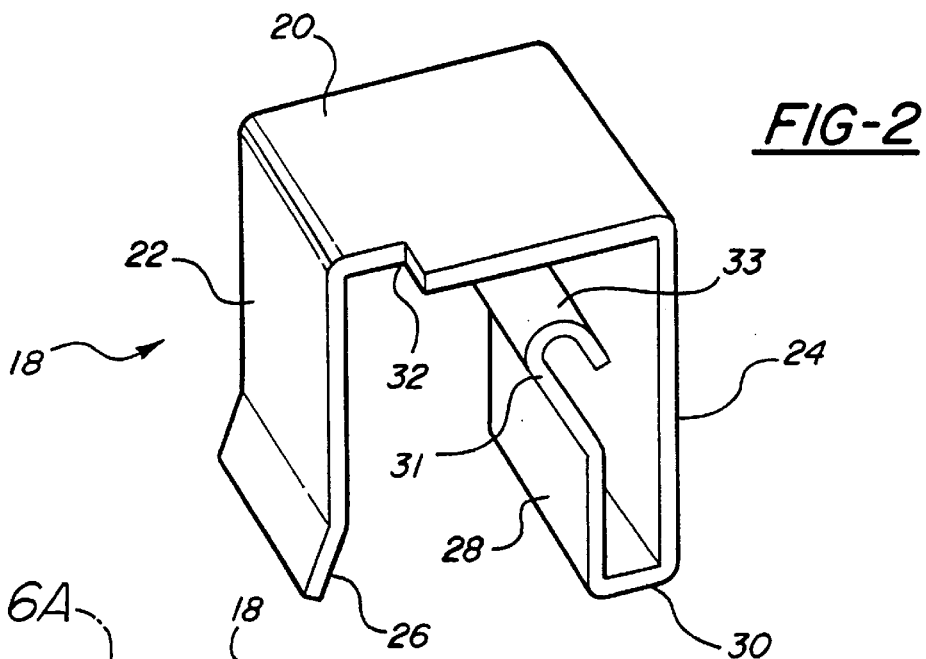
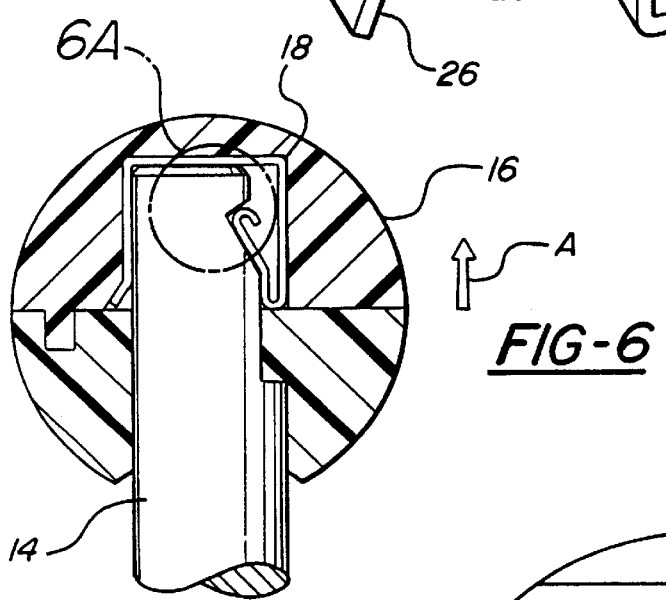
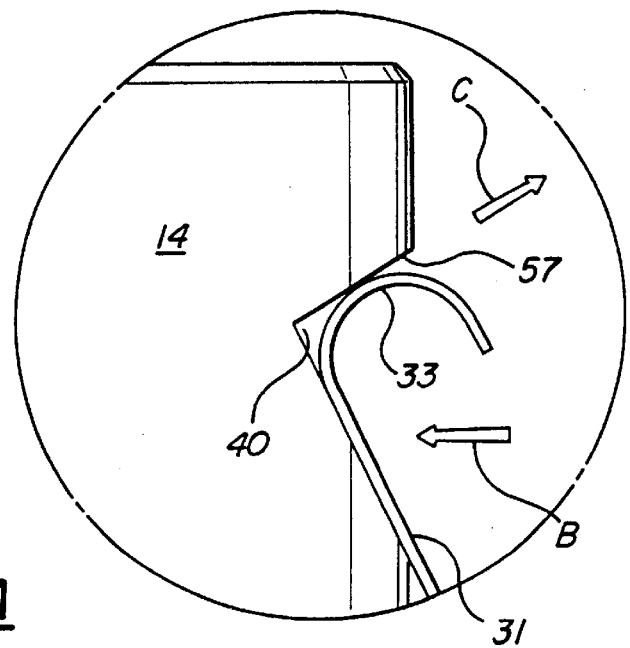

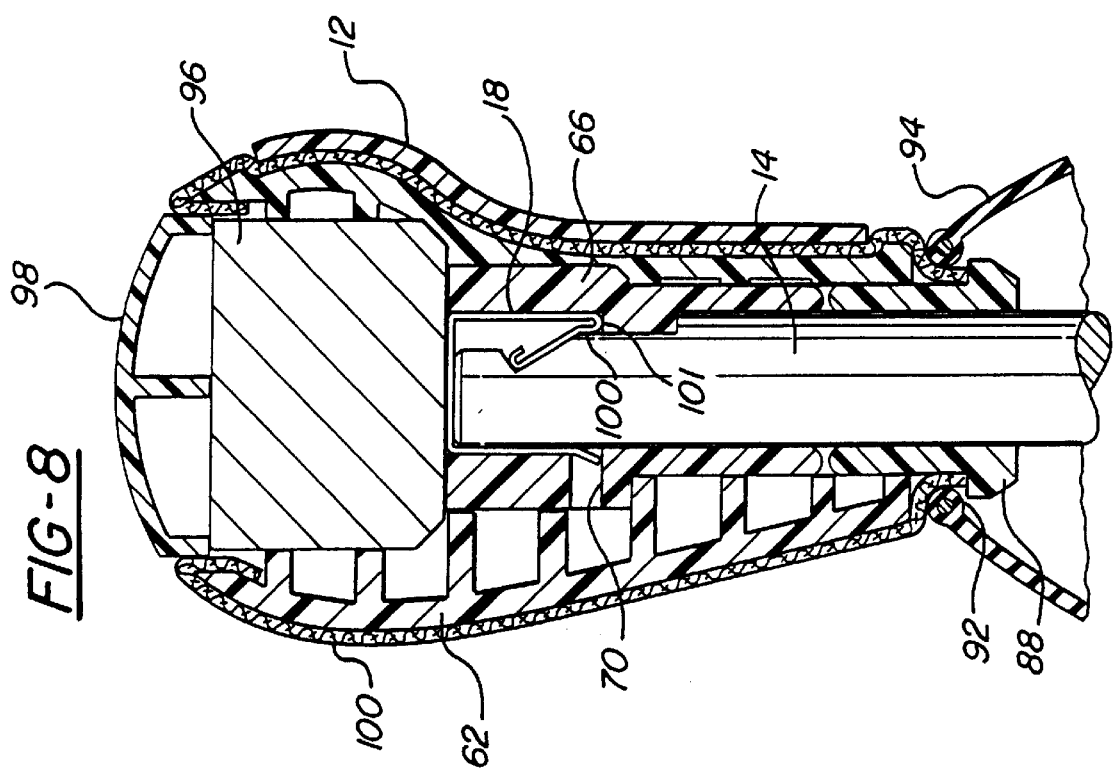
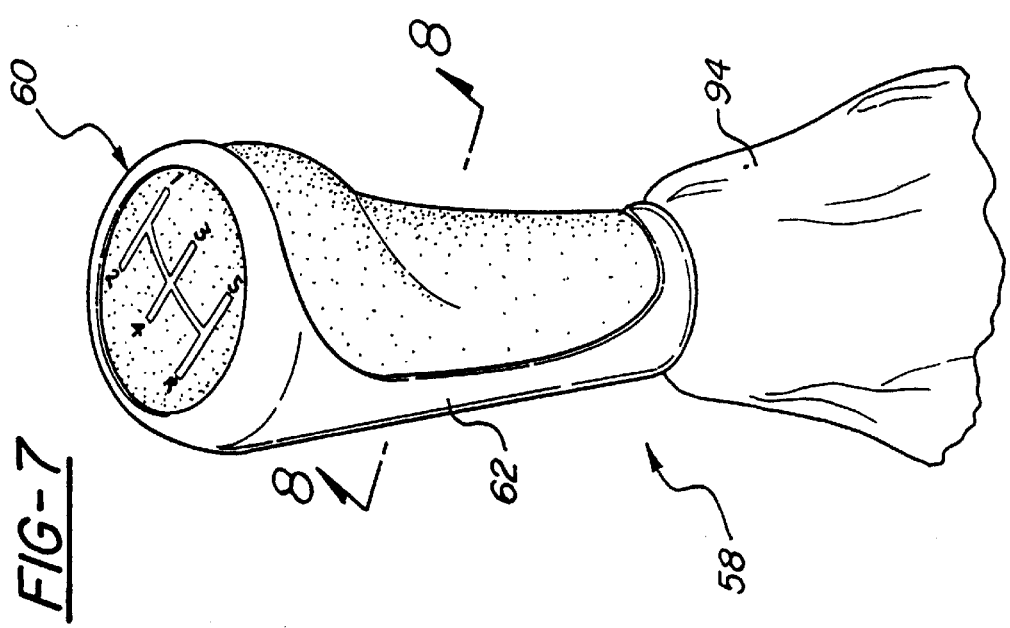

SNAP-ON GEAR SHIFT KNOB

BACKGROUND OF THE INVENTION

The present invention relates to a removable gear shift assembly for motor vehicles.

Gearshift knobs are commonly mounted to the upper end of gearshift shafts. Although the styles of gearshift knobs vary widely, the ways in which to connect the gearshift knob to the gearshift shaft are more limited. It is necessary to keep the knob secured to the shaft so that the knob does not slide off the shaft. It is also necessary to secure the knob to prevent the knob from rotating about the shaft radially. Radial rotation is undesirable because the gear shift knob may have a shape that is non-symmetrical, making a specific orientation preferred. As an example, the shift pattern of the gears is generally displayed on the top side of the gear shift knob, making consistent orientation of the knob necessary.

Knobs are often attached to a shaft by a friction fit. These types of knobs include a cavity with a profile that is slightly smaller than the shaft, such that when the shaft is forced within the knob, the knob will be held to the shaft by friction. Another type includes a cavity with a flat side, and a shaft with a corresponding flat side. A clip has a concave profile and slides into the cavity to rest against the flat side. When the shaft is inserted within the cavity, the clip is compressed between the flat side of the cavity within the knob and the flat side of the shaft. The clip reacts to the compression and exerts force against both flat sides, thereby creating a high friction area between the knob and the shaft that holds the knob onto the shaft.

There are many other examples of knobs that are held onto shafts by friction. These knobs are removable, however, repeated removal and re-assembly of these types of knobs can weaken the hold that the knob exerts onto the shaft. The fit of the knob will eventually deteriorate, thereby making it more likely that the knob will inadvertently come off the shaft, or exhibit noise due to a loose fit.

Knobs have been developed to fit onto shafts with a more substantial attachment, however, these knobs typically are not easily mounted to or removed from the shaft. Knobs of this type require multiple components, and must be assembled as they are mounted to the shaft. Additionally, these knobs require disassembly before they can be removed from the shaft.

SUMMARY OF THE INVENTION AND ADVANTAGES

The present invention is a gearshift knob adapted for mounting to a gearshift shaft. The gearshift knob includes a body and a fastener mounted within the body for removably securing the knob to the shaft. The fastener includes a resilient inner flange that interacts with the shaft to secure the knob to the shaft.

The knob of the present invention can be pre-assembled ahead of time, so at the time of installation to the vehicle the knob is simply placed on to the shaft. The fastener allows the knob to be secured to the shaft without the use of any tools. The fastener holds the knob to the shaft through the interaction of the flange with a notch on the shaft, and also provides rotational stability due to a flat profile of the shaft and the width of the flange.

The fastener also allows the knob to be removed from the shaft without the use of any additional tools. The flange holds the knob to the shaft with sufficient force to withstand normal use and to prevent the knob from coming off the shaft inadvertently, but allows the knob to be removed under sufficient deliberate force. The flange is compressed when the shaft is inserted within the knob, however, the flange is allowed to expand to an only slightly compressed state once the flange is received within the notch on the shaft. Since the flange is compressed slightly, the knob will be secured tightly to the shaft and will not exhibit any noise problems that would be displayed by a loose fit. Since the flange is only slightly compressed, it will not lose resiliency over time from being fully compressed.

The knob of the present invention reduces assembly time, and reduces the number of part numbers associated with the vehicle to which the knob is being installed. Furthermore, the knob of the present invention provides a lasting secure fit to both hold the knob onto the shaft as well as provide rotational stability for the knob.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view of a fastener of the present invention;

FIG. 6 is a side sectional view of a gear shift assembly of the present invention, including a partial close up detail.

FIG. 7 is a perspective view of an alternative embodiment of a gear shift assembly of present invention;

FIG. 8 is a side sectional view of the alternative embodiment of a gear shift assembly of the present invention.

DETAILED DESCRIPTION OF THE PREFERRED EMBODIMENT

Figure 1:
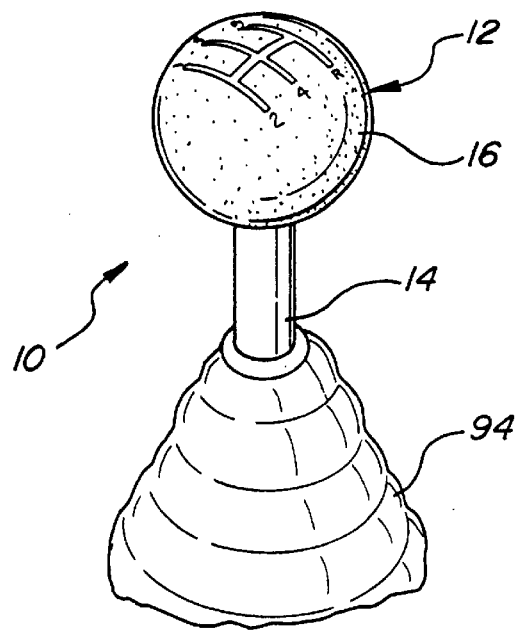
FIG. 1 is a perspective view of a gear shift assembly of the present invention.

Referring to FIG. 1, a gear shift assembly is shown generally at 10. The gear shift assembly includes a knob 12 mounted to a shaft 14. The knob 12 includes a body 16. A fastener 18, (see FIG. 2) is mounted with the body 16 for securing the knob 12 to the shaft 14. The shaft 14 is adapted to interact with the fastener 18 to removably secure the knob 12 to the shaft 14.

Referring to FIG. 2, the fastener 18 is generally U-shaped. The fastener 18 includes a top 20 which is generally square shaped with two arms 22, 24 extending outward at approximately right angles to the top 20. The arms 22, 24 are the same width as the top 20. A first arm 22 includes a tapered end 26 angled outward. The tapered end 26 of the first arm 22 helps to keep the fastener 18 secure when the shaft 14 is inserted. A second arm 24 includes a resilient inner flange 28 extending inward from a distal end 30 of the second arm 24. The resilient inner flange 28 also includes a tapered end 31 that angles inward. The tapered end 31 of the inner flange 28 wraps back around to form a rounded distal tip 33. The fastener 18 also includes a cut-out 32 within the top 20 of the fastener 18 adjacent the first arm 22.

Figure 3A:
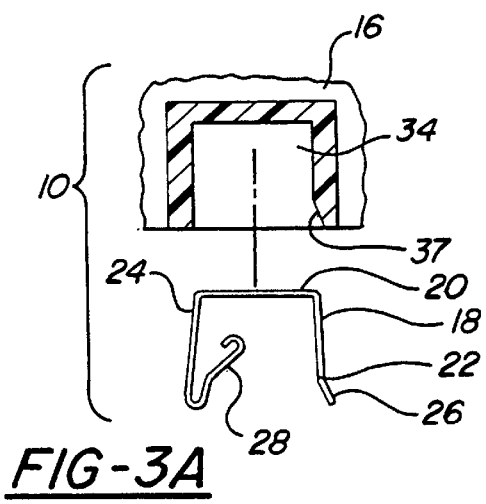
FIGS. 3A through 3D are section views of the fastener and the gear shift shaft of the present invention as the gear shift shaft engages the fastener.
Figure 4:
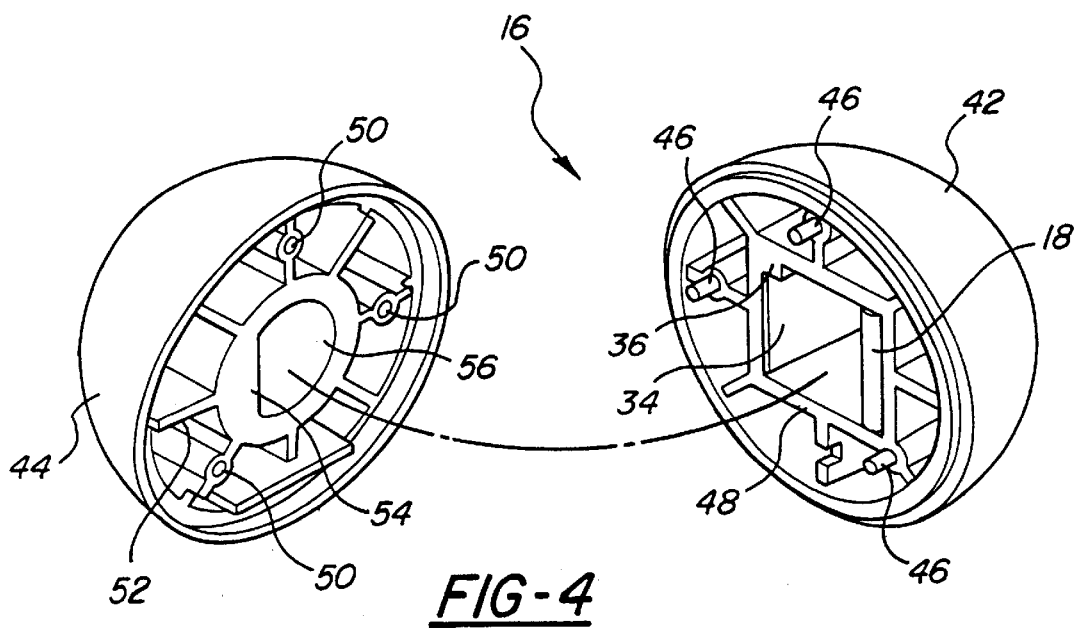
FIG. 4 is an exploded perspective view of a gear sift knob of the present invention.

Referring to FIG. 3A, the two arms 22, 24 of the fastener 18 are preferably angled slightly outward from the top 20 such that the angle of incidence between the first and second arms 22, 24 is slightly more than ninety degrees from the top 20. The body 16 of the gear shift assembly 10 includes a pocket 34 for receiving the fastener 18. The pocket 34 is sized to accept the top 20 of the fastener 18. As can be seen in FIG. 4, the pocket 34 further includes a protrusion 36 that is received into the cut-out 32 within the top 20. The cut-out 32 and the protrusion 36, insure that the fastener 18 is inserted within the pocket 34 in the correct orientation. When the fastener 18 is inserted within the pocket 34, the first and second arms 22, 24 are squeezed within the pocket 34. The first and second arms 22, 24 push outward against the inner walls of the pocket 34 to secure the fastener 18 tightly within the pocket 34. The outer wall of the pocket 34 adjacent the first arm 22 has an angled surface 37 for contacting the outwardly tapered end 26 of the first arm 22.

When the shaft 14 is inserted between the first and second arms 22, 24 of the fastener 18, the shaft 14 contacts the inside surface of the first arm 22 which acts to force the shaft 14 horizontally into engagement with the resilient inner flange 28 of the second arm 24. Further, the tapered end 26 acts to prevent the fastener 18 from moving away from the shaft 14. In the preferred embodiment, the pocket 34 includes a back wall such that the fastener 18 can not move in that direction as the shaft 14 is inserted. However, it is to be understood that other embodiments of the present invention may include pockets that do not include a back wall to prevent the fastener 18 from moving when the shaft 14 is inserted. In this instance, when the shaft 14 is inserted, the first arm 22 and the second arm 24 are forced against the inner walls of the pocket 34. The tapered end 26 of the first arm 22 contacts the angled surface 37 of the pocket 34, thereby preventing the fastener 18 from moving out of the pocket 34.

Figure 3B:
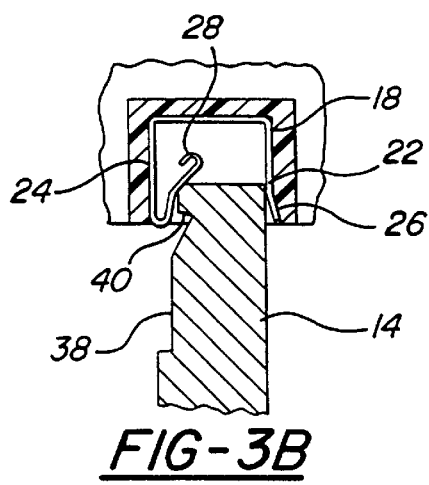
Figure 3C:
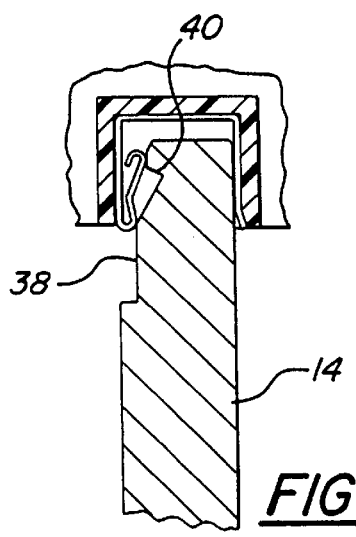
Figure 3D:
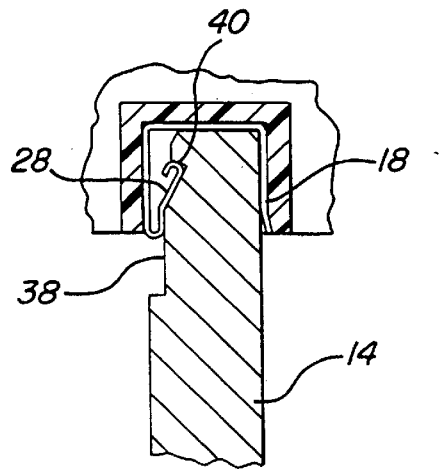

The shaft 14 includes a flat surface 38 on a side. The profile of the flat surface 38 includes a notch 40 for receiving the resilient inner flange 28 of the fastener 18. Referring to FIGS. 3B and 3C, as the shaft 14 is inserted within the fastener 18, the resilient inner flange 28 is flexed outward toward the second arm 24 of the fastener 18. Referring to FIG. 3D, once the shaft 14 is inserted fully within the fastener 18, the resilient inner flange 28 will expand inward to be received within the notch 40 on the flat surface 38 of the shaft 14. Once the resilient inner flange 28 is received within the notch 40 the knob 12 is held securely to the shaft 14. The knob 12 is prevented from sliding off the shaft 14 by the interaction of the notch 40 with the resilient inner flange 28. The knob 12 is held on to the shaft 14 with enough force to withstand inadvertent removal during normal use of the gear shift assembly 10.

Referring to FIG. 4, the body 16 includes a first halt 42 and a second half 44. In the preferred embodiment, the body 16 is spherical and is divided through the center. The first half 42 includes the pocket 34 for receiving the fastener 18. The first half 42 also includes a plurality of guide pins 46 extending from an inner face 48 of the first half 42. The second half 44 includes apertures 50 within an inner face 52 for receiving the guide pins 46 of the first half 42. The second half 44 also includes a support surface 54 for holding the fastener 18 securely within the pocket 34 when the first half 42 is assembled to the second half 44. The second half 44 further includes an opening 56 extending through the second half 44 for receiving the shaft 14.

Figures 5A, 5B, 5C:
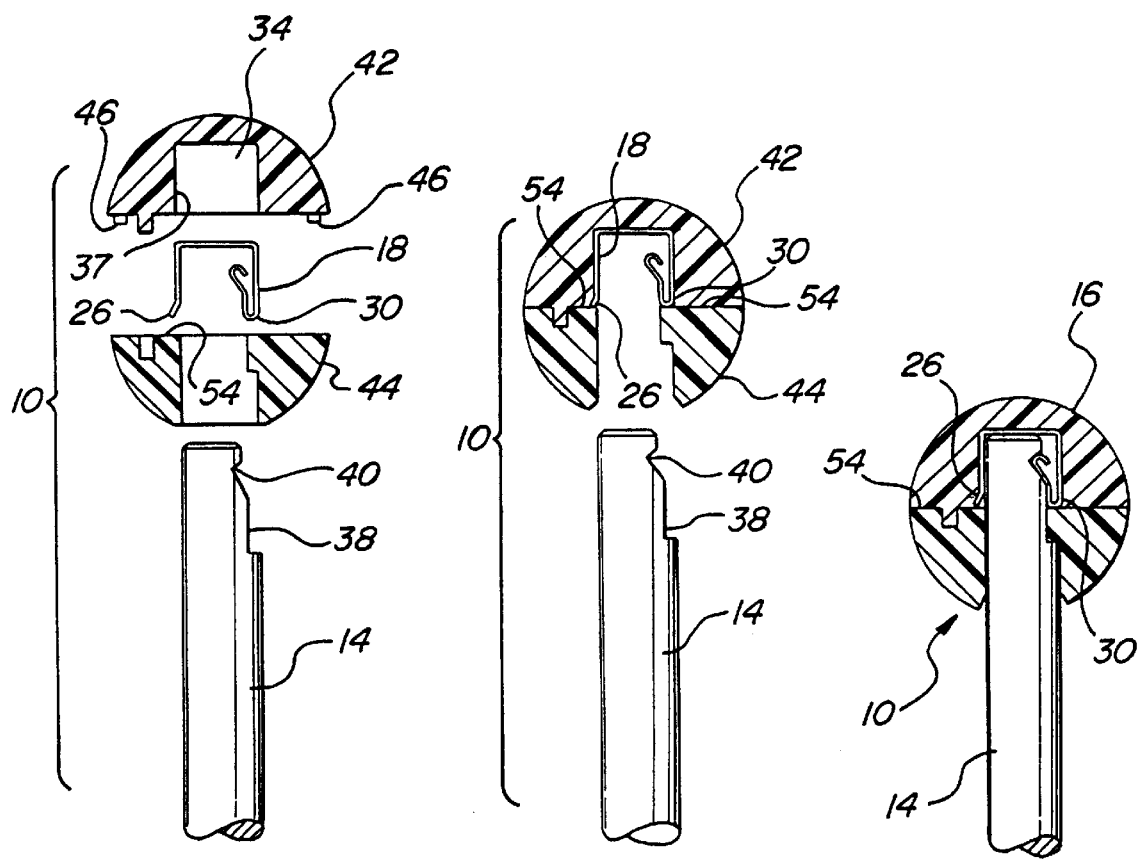
FIG. 5A is an exploded side sectional view of a gear shift assembly of the present invention.
FIG. 5B is a partially exploded side sectional view of a gear shift assembly of the present invention.
FIG. 5C is a side sectional view of a gear shift assembly of the present invention.

Referring to FIGS. 5A through 5C, the fastener 18 is inserted within the pocket 34 of the first half 42 of the body 16, and the second half 44 of the body 16 is assembled to the first half 42. The tapered distal end 26 of the first arm 22 extends outward from the fastener 18 and rests upon the support surface 54. The distal end 30 of the second arm 24 also rests on the support surface 54 of the second half 44. The distal ends 26, 30 of the first and second arms 22, 24 of the fastener 18 are held tightly within the pocket 34 within the body 16 by the support surface 54 of the second half 44 of the body 16. The opening 56 within the second half 44 is sized to accept the shaft 14 such that the shaft 14 can be inserted therein to engage the fastener 18 and thereby secure the body 16 to the shaft 14.

The resilient inner flange 28 can be flexed outward to allow removal of the knob 12 under a sufficiently high force, such that would not be experienced under normal use conditions. In this way, the knob 12 can be removed by a mechanic or other such person when repairs need to be made to the gear shift assembly 10. Referring to FIG. 6, to remove the knob 12 from the shaft 14, the knob 12 must pulled in the direction indicated by arrow A. The rounded distal tip 33 of the resilient inner flange 28 is received within the notch 40 when the knob 12 is in place on the shaft 14. The notch 40 includes an upper angled surface 57. The resilient inner flange 28 of the fastener 18 is in a slightly compressed state thereby causing the resilient inner flange 28 to exert a force in the direction shown by arrow B. This force acts to maintain the rounded distal tip 33 of the resilient inner flange 28 within the notch 40.

When an attempt is made to move the knob 12 in the direction indicated by arrow A, the rounded distal tip 33 of the resilient inner flange 28 contacts the upper angled surface 57 of the notch 40 and prevents further movement. However, the angled surface 57 provides a ramp that will assist the rounded distal tip 33 in moving out of the notch 40. Therefore, if sufficient force is exerted, to overcome the resilient force of the inner flange 28, the rounded distal tip 33 of the resilient inner flange 28 will move upward along the upper angled surface 57 of the notch 40 in a direction indicated by arrow C. There is additional resistance due to friction between the upper angled surface 57 and the rounded distal tip 33. However, if the force exerted upon the knob 12 is sufficient, the resilient inner flange 28 will flex away from the shaft 14, until the rounded distal end 33 moves beyond the upper angled surface 57 and out of the notch 40, allowing the knob 12 to be removed from the shaft 14.

Furthermore, the knob 12 is secured rotationally by the interaction of the resilient inner flange 28 with the flat surface 38 of the shaft 14. The resilient inner flange 28 has a width that is equal to the width of the top 20 of the fastener 18. The resilient inner flange 28 rests against the flat surface 38 of the shaft 14 to prevent any radial rotation of the knob 12 once the shaft 14 has fully engaged the fastener 18 within the knob 12.

Referring to FIG. 7, an alternative embodiment of the gear shift assembly is shown generally at 58. The alternative gear shift assembly 58 includes a knob 60 mounted to the shaft 14. The knob 60 includes a body 62. The fastener 18 is mounted within the body 62 for securing the knob 60 to the shaft 14. The shaft 14 is adapted to interact with the fastener 18 to removably secure the knob 60 to the shaft 14.

Figure 9:
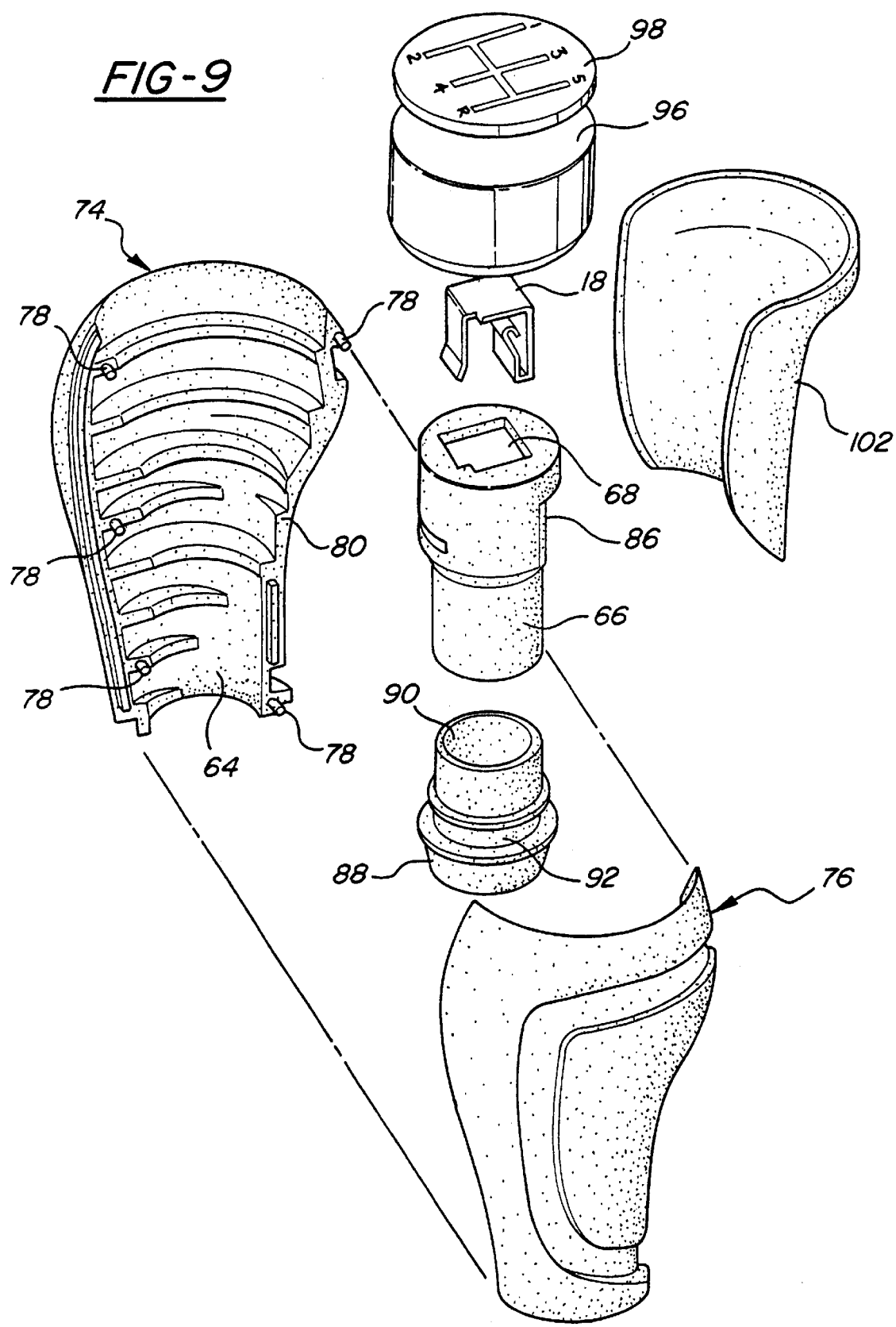
FIG. 9 is an exploded perspective view of the alternative embodiment of a gear shift assembly of the present invention.

Referring to FIGS. 8 and 9, the alternative knob 60 includes a body 62 that has an opening 64 extending therethrough. The fastener 18 is mounted within a cartridge 66, and the cartridge 66 is mounted within the opening 64. The cartridge 66 includes a pocket 68 for receiving the fastener 18. At the bottom of the pocket 68 the cartridge 66 includes a support surface 70 which supports the fastener 18 within the cartridge 66. An end 100 of the fastener rests on a surface 101. When the fastener 18 is inserted within the pocket 34, the distal ends of the first arm 22 and the second arm 24 contact, and are supported by, the support surface 70 within the cartridge. The cartridge 66 further includes an aperture 72 extending from the bottom of the cartridge 66 for receiving the shaft 14.

The body 62 of the alternative embodiment 58 includes a first half 74 and a second half 76. The first half 74 includes a plurality of guide pins 78 extending from an inner face 80 of the first half 74. The second half 76 includes apertures 82 within an inner face 84 for receiving the guide pins 78 of the first half 74. The first half 74 and second half 76 of the body 62 are generally concave in shape such that when the first half 74 and the second half 76 are assembled, the opening 64 through the body 62 is defined. The profile of the inner walls of the first half 74 and second half 76 of the body 62 are such that the cartridge 66 fits snuggly within the opening 64 through the body 62. The cartridge 66 further includes a flat side 86 which corresponds to the profile within the opening 64 to insure that the cartridge 66 is inserted in the proper orientation.

A boot adapter 88 is mounted within the opening 64 directly below the cartridge 66. The boot adapter 88 includes a center opening 90 to allow the shaft 14 to be inserted through the boot adapter 88 when the knob 60 is assembled to the shaft 14. The boot adapter 88 further includes a channel 92 about the circumference of the boot adapter 88 at a lower distal end of the boot adapter 88. The channel 92 allows a decorative boot 94 to be attached to the lower portion of the knob 60 to present a pleasing cosmetic appearance to the assembly 58.

Once the cartridge 66 is placed within the opening 64 of the body 62, a weight 96 is placed within the opening 64 directly above the cartridge 66. The weight 96 is placed within the body 62 to balance and provide stability to the knob 60. A decorative cover 98 is placed over the weight 96. The decorative cover 98 preferably includes markings to indicate the shift pattern of the gears. The body 62 preferably includes an outer covering 100 of leather or other suitable material and a front face plate 102 to provide a cosmetically appealing appearance.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A gear shift assembly comprising:
   a gear shift knob including a body;
   a gear shift shaft adapted for receiving said gear shift knob;
   a fastener secured within said body and selectively engageable with said gear shift shaft for removably securing said gear shift knob to said gear shift shaft;
   said fastener including a resilient inner flange for interacting with said gear shift shaft to removably secure said gear shift knob to said gear shift shaft such that said gear shift knob is removable by simply pulling upward on said gear shift knob, said fastener including a top portion with a first leg and a second leg extending downwardly there from for engaging said gear shift shaft; and
   said gear shift shaft includes a notch for receiving said resilient inner flange of said fastener, and said resilient inner flange extends radially inward from a distal end of said second leg, said distal end being defined to be spaced at the opposed end of said second leg from said top portion.

2. The gear shift assembly as set forth in claim 1 wherein said first and second legs extend from said top portion at angles forming a generally U-shaped configuration.

3. The gear shift assembly as set forth in claim 1 wherein said first leg includes a tapered end for securing said fastener within said body when said gear shift shaft is inserted between said first and second legs of said fastener.

4. The gear shift assembly as set forth in claim 1 wherein said resilient inner flange further includes an inwardly angled tapered end received within said notch of said gear shift shaft.

5. The gear shift assembly as set forth in claim 4 wherein said inwardly angled tapered end further includes a rounded distal tip.

6. The gear shift assembly as set forth in claim 5 wherein said notch includes an angled upper surface for contacting said rounded distal tip.

7. The gear shift assembly as set forth in claim 1 wherein said body includes a pocket for receiving said fastener.

8. The gear shift assembly as set forth in claim 1 wherein said body defines a generally hollow structure with an opening extending there through.

9. The gear shift assembly as set forth in claim 1 wherein said fastener is secured within a cartridge, said cartridge being secured within said body.

10. The gear shift assembly as set forth in claim 9 wherein said cartridge includes
    a support surface for providing support of distal ends of said first and second legs of said fastener when said fastener is inserted within said cartridge.

11. The gear shift assembly as set forth in claim 9 further including a boot adapter inserted on one side of said cartridge, a weight inserted on an opposed second side of said cartridge, and a decorative cap mounted to said gear shift knob on a side of said weight spaced from said cartridge.

12. The gear shift assembly as set forth in claim 1 wherein said body comprises a first half, and a second half joined to said first half.

13. The gear shift assembly as set forth in claim 12 wherein said first half includes guide pins extending therefrom, and said second half includes apertures for receiving said guide pins when said first half is joined to said second half.

14. The gear shift assembly as set forth in claim 13 wherein said second half includes a support surface for providing support to the distal ends of said first and second arms of said fastener when said first and second halves of said body are assembled.

15. A gear shift assembly comprising:

a gear shift knob including a body;

a gear shift shaft adapted for receiving said gear shift knob;

a fastener enclosed within said body for removablu securing said gear shift knob to said gear shift shaft such that said gear shift knob is removably by simply pulling upward on said gear shift knob;

said fastener including a top portion, a first leg and a second leg, said first and second legs extending from said top portion to form a generally U-shaped configuration;

said first leg including a tapered distal end for contacting a corresponding ramped surface of said body to secure said fastener within said body;

said second leg including a resilient inner flange extending inward from a distal end of said second leg for interacting with said gear shift shaft to removalby secure said gear shift knob to said gear shift shaft;

said gear shift including a notch for receiving said resilient inner flange of said fastener;

said resilient inner flange including an inwardly angled tapered end received within said notch of said gear shift shaft;

said inwardly angled tapered end further including a rounded distal tip, and said notch including an angled upper surface for contacting said rounded distial tip.

* * * * *

UNITED STATES PATENT AND TRADEMARK OFFICE
CERTIFICATE OF CORRECTION

PATENT NO. : 6,421,881 B1
DATED : July 23, 2002
INVENTOR(S) : Shovlin

It is certified that error appears in the above-identified patent and that said Letters Patent is hereby corrected as shown below:

<u>Column 6,</u>
Line 10, "there from" should be -- therefrom --
Line 39, "there through" should be -- therethrough --

<u>Column 7,</u>
Line 5, "removablu" should be -- removably --
Line 7, "removably" should be -- removable --

<u>Column 8,</u>
Line 3, "removalby" should be -- removably --

Signed and Sealed this

Fifteenth Day of October, 2002

Attest:

JAMES E. ROGAN
Attesting Officer     Director of the United States Patent and Trademark Office